3,351,682
O-ARYL DIALKYLPHOSPHINOTHIOATES
Joseph W. Baker and John P. Chupp, Kirkwood, Mo., and Peter E. Newallis, Morris Plains, N.J., assignors to Monsanto Company, a corporation of Delaware
No Drawing. Original application Dec. 18, 1959, Ser. No. 860,374. Divided and this application June 4, 1962, Ser. No. 199,600
7 Claims. (Cl. 260—954)

This application is a division of co-pending application Serial No. 860,374, filed December 18, 1959, now abandoned.

This invention relates to a new and useful class of phosphorus-containing organic compounds and to methods of preparing same. Additionally, this invention relates to pesticidal compositions comprising the new phosphorus-containing organic compounds as an active ingredient.

The phosphorus-containing organic compounds of this invention can be termed broadly phenyl dialkylphosphinothioates and can be represented by the general formula

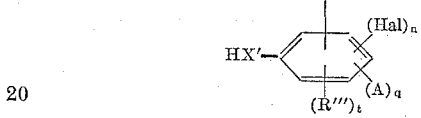

wherein R' and R" are like or unlike lower alkyl radicals (i.e., alkyl radicals containing from 1 to 5 carbon atoms e.g., methyl, ethyl, n-propyl, isopropyl, n-butyl, isobutyl, n-amyl, isoamyl, and the various isomeric forms thereof); wherein X and X' are sulfur or oxygen, but wherein at least one of X and X' is sulfur; wherein Hal is a halogen having an atomic number not higher than 35 (i.e., chlorine, bromine, or fluorine); wherein A is cyano (i.e. —CN) or

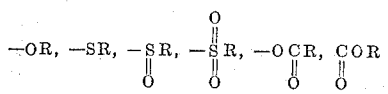

or

wherein R is a lower alkyl radical (i.e., alkyl radicals containing from 1 to 5 carbon atoms, e.g., methyl, ethyl, n-propyl, isopropyl, n-butyl, isobutyl, n-amyl, isoamyl, and the various isomeric forms thereof); wherein R''' is a lower alkyl radical or a halogen-substituted lower alkyl radical wherein the sum total of halogen substituents is not in excess of four (by "lower alkyl radical" is meant an alkyl radical which contains from 1 to 5 carbon atoms as exemplified by methyl, ethyl, n-propyl, isopropyl, n-butyl, isobutyl, n-amyl, and the various isomeric forms thereof, and by "halogen" is meant a halogen having an atomic number not higher than 35, i.e. chlorine, bromine or fluorine); wherein $m$ is a number from 0 to 2, inclusive; wherein $n$ is a number from 0 to 3, inclusive; wherein $q$ is a number from 0 to 2, inclusive; wherein $t$ is a number from 0 to 2, inclusive; and wherein the sum total of $m$, $n$, $q$ and $t$ is a number from 0 to 3, inclusive.

The phenyl dialkylphosphinothioates of this invention can be prepared by reacting the appropriate acid halide of the structure

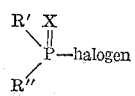

wherein R', R" and X, respectively, have the aforedescribed significance, and wherein the term "halogen" means chlorine or bromine, but preferably chlorine, with a substantially equimolecular proportion of a compound of the structure

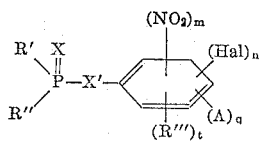

wherein X', Hal, A, R''', $m$, $n$, $q$ and $t$, respectively have the aforedescribed significance, in an anhydrous medium in the presence of an inert organic liquid or solvent (e.g., acetone, methyl ethyl ketone, carbon tetrachloride, benzene, toluene, xylene, ethyl acetate, isopropyl acetate, or mixtures of two or more inert organic liquids or solvents), and a hydrogen halide (i.e., hydrogen chloride or hydrogen bromide) scavenging agent (e.g., sodium carbonate, potassium carbonate, the tertiary organic amines such as triethylamine, tributylamine, dimethylaniline, pyridine, 1-pipecoline, piperidine, lutidine and the like) in a sufficient amount to absorb the hydrogen halide by-product. The scavenging agent can be added in an equivalent amount at the beginning of the reaction or gradually during the course of the reaction. While a wide range of reaction temperatures can be employed provided the reaction system is fluid (i.e., the system is maintained at a temperature above the freezing point of the system and up to and including the boiling point of the system), it is preferred that a reaction temperature in the range of about 20° C. to about 120° C. be employed. Ordinarily the reaction is carried out at atmospheric pressure, however, pressures above or below atmospheric pressure can be employed where and when desired.

The phenyl dialkylphosphinothioates of this invention as a class are characterized by a broad scope of pesticidal acitivity, including insecticidal, fungicidal, acaricidal, and ovicidal activity; in addition some of these new compounds exhibit herbicidal activity. This unusually broad range of activity appears to be a general characteristic of this new class of compounds, some of which of course show higher toxicity and/or greater specificity than others. Of the new compounds those found to be particularly valuable in the control of insects and arachnids and allied classes of arthropods are those of the foregoing structural formula wherein R' and R" are like alkyl radicals containing not more than two carbon atoms (i.e., methyl or ethyl) and preferably containing not more than one carbon atom (i.e., methyl); wherein X is sulfur; wherein X' is oxygen; wherein Hal is a halogen having an atomic number not higher than 35, e.g., chlorine, bromine or fluorine, but preferably chlorine; wherein R''' has the aforedescribed significance but is preferably methyl or halogen-substituted methyl wherein the halogen substituent is a halogen having an atomic number not higher than 35, e.g., chlorine, bromine or fluorine, but preferably fluorine; wherein *m* is a number from 0 to 2, inclusive; wherein *n* is a number from 0 to 3, inclusive; wherein *q* is zero; wherein *t* is a number from 0 to 2, inclusive; and wherein the sum total of *m*, *n* and *t* is a number from 0 to 3, inclusive. This particular group of phenyl dialkylphosphinothiates can be represented by the general formula

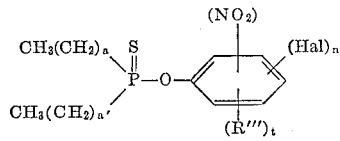

wherein *a* and *a'* are like numebrs from 0 to 1, inclusive. Of this group of phenyl dialkylphosphinothioates the preferred for use as systemic agents are the phenyl dimethylphosphinothioates of the general formula

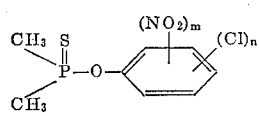

wherein *m* is a number from 0 to 2 inclusive; wherein *n* is a number from 0 to 3, inclusive; and wherein the sum total of *m* and *n* is a number from 0 to 3, inclusive; and of this preferred group of new systemic pesticidal agents the desired members for use as systemic acaricidal agents (miticidal agents) are those phenyl dimethylphosphinothioates whose phenyl nucleus is free of substituents in the 3 and 5 positions wtih respect to the —O-group.

As illustrative of particularly valuable phenyl dimethylphosphinothioates and phenyl diethylphosphinothioates of this invention are the following:

O-(phenyl) dimethylphosphinothioate
O-(2-chlorophenyl) dimethylphosphinothioate
O-(3-chlorophenyl) dimethylphosphinothioate
O-(4-chlorophenyl) dimethylphosphinothioate
O-(4-bromophenyl) dimethylphosphinothioate
O-(4-fluorophenyl) dimethylphosphinothioate
O-(2-nitrophenyl) dimethylphosphinothioate
O-(3-nitrophenyl) dimethylphosphinothioate
O-(4-nitrophenyl) dimethylphosphinothioate
O-(2-methylphenyl) dimethylphosphinothioate
O-(3-chloromethylphenyl) dimethylphosphinothioate
O-(4-chloromethylphenyl) dimethylphosphinothioate
O-(4-dichloromethylphenyl) dimethylphosphinothioate
O-(3-trifluoromethylphenyl) dimethylphosphinothioate
O-(4-trifluoromethylphenyl) dimethylphosphinothioate
O-(2,4-dichlorophenyl) dimethylphosphinothioate
O-(3,4-dichlorophenyl) dimethylphosphinothioate
O-(3,5-dichlorophenyl) dimethylphosphinothioate
O-(2-chloro-4-bromophenyl) dimethylphosphinothioate
O-(2-chloro-4-fluorophenyl) dimethylphosphinothioate
O-(2,6-dimethylphenyl) dimethylphosphinothioate
O-(3,4-dimethylphenyl) dimethylphosphinothioate
O-(3,5-dimethylphenyl) dimethylphosphinothioate
O-(3-methyl-4-chlorophenyl) dimethylphosphinothioate
O-(3-methyl-4-bromophenyl) dimethylphosphinothioate
O-(2-chloro-4-nitrophenyl) dimethylphosphinothiate
O-(2-nitro-4-chlorophenyl) dimethylphosphinothioate
O-(3-chloro-4-nitrophenyl) dimethylphosphinothioate
O-(3-methyl-4-nitrophenyl) dimethylphosphinothioate
O-(3-trifluoromethyl-4-nitrophenyl) dimethylphosphinothioate
O-(3-trifluoromethyl-4-methylphenyl) dimethylphosphinothioate
O-(2,4-dinitrophenyl) dimethylphosphinothioate
O-(3,5-dinitrophenyl) dimethylphosphinothioate
O-(2,4,5-trichlorophenyl) dimethylphosphinothioate
O-(3,5-dimethyl-4-chlorophenyl) dimethylphosphinothioate
O-(2,4,5-tribromophenyl) dimethylphosphinothioate
O-(2,6-dibromo-4-nitrophenyl) dimethylphosphinothioate
O-(2,6-dichloro-4-nitrophenyl) dimethylphosphinothioate
O-(2,6-dichloro-4-bromophenyl) dimethylphosphinothioate, and the corresponding phenyl diethylphosphinothioates. These compounds can be prepared conveniently by reacting in an anhydrous medium at a temperature in the range of 20° C. to 120° C. dimethylphosphinothioic chloride or diethylphosphinothioic chloride, i.e.

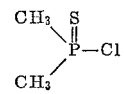

or

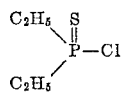

with a substantially equimolecular proportion of a phenolic compound of the structure

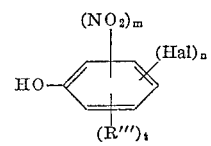

wherein Hal is chlorine, bromine or fluorine, but preferably chlorine; wherein R''' is lower alkyl or halogen-substituted lower alkyl wherein the halogen substituent is chlorine, bromine or fluorine, but preferably fluorine; wherein *m* is a number from 0 to 2, inclusive; wherein *n* is a number from 0 to 3, inclusive; wherein *t* is a number from 0 to 2, inclusive; and wherein the sum total of *m*, *n* and *t* is a number from 0 to 3, inclusive, in the presence of an inert organic liquid or solvent and a hydrogen chloride scavenging agent in a sufficient amount to absorb the byproduct hydrogen chloride. These phenyl dimethylphosphinothioates and phenyl diethylphosphinothioates of this invention can also be prepared by reacting the appropriate acid chloride of the structure

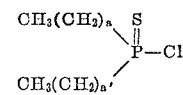

wherein *a* and *a'* are like numbers from 0 to 1, inclusive, with a substantially equimolecular proportion of an alkali metal phenate of the general formula

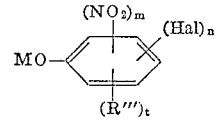

wherein Hal, R''', *m*, *n* and *t* have the immediate aforedescribed significance and wherein M is an alkali metal, e.g., sodium, potassium or lithium, in an anhydrous medium in the presence of an inert organic liquid or solvent (e.g., benzene, toluene, xylene, ethyl acetate, isopropyl acetate). While a wide range of reaction temperatures can be employed, provided the reaction system is fluid (i.e., above the freezing point of the system and up to the system's boiling point) it is preferred to employ a reaction temperature in the range of from about 20° C. to about 120° C.

As further illustrative of the phosphorus-containing organic compounds of this invention are:

S-(phenyl) dimethylphosphinothioate
S-(4-chlorophenyl) dimethylphosphinothioate
S-(4-nitrophenyl) dimethylphosphinothioate S-(3-trifluoromethylphenyl) dimethylphosphinothioate
O-(4-chlorophenyl) di-(n-propyl)-phosphinothioate
O-(4-nitrophenyl) diisopropylphosphinothioate
O-(4-nitrophenyl) diisoamylphosphinothioate
O-(4-nitrophenyl) ethylmethylphosphinothioate
S-(4-chlorophenyl) diethylphosphinothioate
S-(4-nitrophenyl) diethylphosphinothioate
S-(4-methylphenyl) diethylphosphinothioate
S-(4-chloromethylphenyl) diethylphosphinothioate
S-(4-chloromethylphenyl) dimethylphosphinodithioate
S-(4-dichloromethylphenyl) dimethylphosphinodithioate
S-(4-tert.butylphenyl) dimethylphosphinodithioate
S-(4-methylphenyl) dimethylphosphinothioate
S-(3-nitrophenyl) diethylphosphinothioate
S-(4-chlorophenyl) dimethylphosphinodithioate
S-(4-nitrophenyl) dimethylphosphinodithioate
S-(4-nitrophenyl) diisopropylphosphinodithioate
S-(3-nitro-4-chlorophenyl) diethylphosphinothioate
S-(2-chloro-4-nitrophenyl) diethylphosphinothioate
S-(3-chloro-4-nitrophenyl) diethylphosphinothioate
S-(2-methyl-4-nitrophenyl) diethylphosphinothioate
S-(3-chloro-4-nitrophenyl) diisopropylphosphinothioate
S-(2-chloro-4-nitrophenyl) diethylphosphinodithioate
S-(2-chloro-4-nitrophenyl) diisopropylphosphinodithioate
S-(3-trifluoromethyl-4-nitrophenyl) diethylphosphinothioate
S-(2,4-dichlorophenyl) diisobutylphosphinodithioate
S-(2,4-dinitrophenyl) dimethylphosphinothioate
S-(2,4,5-trichlorophenyl) dimethylphosphinothioate
S-(2,4,5-trichlorophenyl) dimethylphosphinodithioate
S-(2,4,5-trichlorophenyl) diethylphosphinothioate
S-(2,4,5-trichlorophenyl) diethylphosphinodithioate
O-(2,6-dichloro-4-nitrophenyl) diethylphosphinothioate
S-(2,6-dichloro-4-nitrophenyl) dimethylphosphinothioate
S-(2,6-dichloro-4-nitrophenyl) diethylphosphinothioate
O-(2,6-dimethyl-4-nitrophenyl) diethylphosphinothioate
O-(4-cyanophenyl) dimethylphosphinothioate
O-(3-methylcarbonyloxyphenyl) dimethylphosphinothioate
O-(3-ethylcarbonyloxyphenyl) dimethylphosphinothioate
O-(4-ethoxycarbonylphenyl) dimethylphosphinothioate
O-(4-isopropoxycarbonylphenyl) diethylphosphinothioate
O-(3,4-dimethoxyphenyl) dimethylphosphinothioate
O-(3,4-diethoxyphenyl) dimethylphosphinothioate
O-(4-methoxyphenyl) dimethylphosphinothioate
O-(4-acetyloxyphenyl) dimethylphosphinothioate
O-(4-tert.butylphenyl) dimethylphosphinothioate
O-(4-methylcarbonyloxyphenyl) dimethylphosphinothioate
O-(2-chloro-4-ethoxyphenyl) dimethylphosphinothioate
O-(4-methylmercaptophenyl) dimethylphosphinothioate
O-(4-methylsulfinylphenyl) dimethylphosphinothioate
O-(4-methylsulfonylphenyl) dimethylphosphinothioate
O-(4-methylcarbonylphenyl) dimethylphosphinothioate As illustrative of the preparation of the phosphorus-containing compounds of this invention is the following:

*Example I*

To a suitable reaction vessel equipped with a reflux condenser, thermometer and agitator is charged approximately 15.1 parts by weight (substantially 0.16 mol) of phenol dissolved in approximately 150 parts by weight of toluene. Thereto at room temperature is added slowly and with agitation approximately 8.35 parts by weight (substantially 0.155 mol) of sodium methylate. The mixture is then heated at 60° C. with agitation for 30 minutes. The temperature of the mass is then increased slowly to 110–115° C. to remove the methanol by-product. The residue, i.e. the slurry of sodium phenate in toluene, is then cooled to room temperature. To the residue at room temperature is added slowly and with agitation approximately 19.2 parts by weight (substantially 0.15 mol) of dimethylphosphinothioic chloride. The reaction mass is then heated at 70–80° C. with agitation for approximately 4 hours. The agitator is stopped and the reaction mass is cooled to room temperature and filtered. The filtrate is washed first with a 3 percent aqueous sodium carbonate solution and then with water. The toluene in the so-washed filtrate is then stripped off by heating to 100° C. at 8 mm. pressure. The white crystalline solid remaining is recrystallized from hexane. The recrystallized material is white crystalline O-(phenyl) dimethylphosphinothioate melting at 36–38° C. The yield is 96.5 percent by weight based on the dimethylphosphinothioic chloride charged.

*Analysis.*—Theory: 16.7% phosphorus, 17.2% sulfur. Found: 16.3% phosphorus, 17.9% sulfur.

*Example II*

To a suitable reaction vessel equipped with a reflux condenser, thermometer and agitator is charged approximately 20.5 parts by weight (substantially 0.16 mol) of 4-chlorophenol dissolved in approximately 150 parts by weight of toluene. Thereto at room temperature is added slowly and with agitation approximately 8.3 parts by weight (substantially 0.155 mol) of sodium methylate. The mixture is then heated with agitation at 60° C. for 30 minutes. The temperature of the mass is then increased slowly to 110° C. to remove the methanol byproduct. The residue, i.e. the toluene slurry of sodium 4-chlorophenate, is then cooled to room temperature. To the residue at room temperature is added slowly and with agitation approximately 19.2 parts by weight (substantially 0.15 mol) of dimethylphosphinothioic chloride. The reaction mass is then heated at 70–80° C. with agitation for approximately 4 hours. The agitator is stopped and the reaction mass cooled to room temperature and filtered. The filtrate is washed first with a 3 percent aqueous sodium carbonate solution and then with water. The solvent (i.e. toluene) is then removed by stripping the so-washed filtrate by heating to 100° C. at 5 mm. pressure. The white crystalline solid remaining is O-(4-chlorophenyl) dimethylphosphinothioate, melting at 43–45° C. after recrystallizing from hexane. The yield is quantitative based on the dimethylphosphinothioic chloride charged.

*Analysis.*—Theory: 14.1% P, 14.6% S, 16.2% Cl. Found: 13.8% P, 15.3% S, 16.5% Cl.

Employing the above procedure but replacing dimethylphosphinothioic chloride with an equimolecular amount of diethylphosphinothioic chloride, there is obtained O-(4-chlorophenyl) diethylphosphinothioate, a solid which is soluble in acetone.

*Example III*

To a suitable reaction vessel equipped with a thermometer, agitator and reflux condenser is charged in the cold (about 10° C.) approximately 100 parts by weight of acetone, approximately 14.5 parts by weight (substantially 0.014 mol) of 4-nitrophenol, approximately 10.8 parts by weight (substantially 0.102 mol) of anhydrous sodium carbonate, and approximately 12.8 parts by weight (substantially 0.10 mol) of dimethylphosphinothioic chloride. The mixture is then heated to the reflux temperature (about 60° C.) and refluxed for about 3 hours. Thereafter the acetone is stripped off at 80° C. and the resulting residue quenched with water and the mass extracted with chloroform. The chloroform solution is then washed first with a 3 percent aqueous sodium carbonate solution and then with water. The chloroform is then stripped off by heating to 90° C. at 5 mm. pressure yielding crude white solid O-(4-nitrophenyl) dimethylphosphinothioate (65 percent yield). This crude solid product upon recrystallization from diethyl ether yielded white crystalline O-(4-nitrophenyl) dimethylphosphinothioate melting at 144–146° C.

*Analysis.*—Theory: 6.1% N, 13.8% S, 13.4% P. Found: 6.0% N, 13.2% S, 12.8% P.

Employing the above procedure but replacing dimethylphosphinothioic chloride with an equimolecular amount of diethylphosphinothioic chloride there is obtained white crystalline O-(4-nitrophenyl) diethylphosphinothioate, which material is soluble in acetone.

Example IV

To a suitable reaction vessel equipped with a reflux condenser, thermometer and agitator is charged approximately 17.3 parts by weight (substantially 0.16 mol) of p-cresol dissolved in approximately 150 parts by weight of toluene. Thereto at room temperature is added slowly and with agitation approximately 8.3 parts by weight (substantially 0.15 mol) of sodium methylate. The mixture is then heated at 60° C. with agitation for 30 minutes. The temperature of the mass is then increased slowly to 110–115° C. to remove the methanol byproduct. The residue, i.e. the toluene slurry of sodium 4-methylphenate, is then cooled to room temperature. To the residue at room temperature is added slowly and with agitation approximately 19.2 parts by weight (substantially 0.15 mol) of dimethylphosphinothioic chloride. The reaction mass is then heated at 79–80° with agitation for about 4 hours. The agitator is stopped and the reaction mass is cooled to room temperature and filtered. The filtrate is washed first with a 3 percent aqueous sodium carbonate solution and then with water. The solvent (i.e. toluene) in the so-washed filtrate is then stripped off by heating to 100° C. at 5 mm. pressure. The colorless liquid remaining is O-(4-methylphenyl) dimethylphosphinothioate boiling at 103° C. at 0.2 mm. pressure. The yield of distilled material is 70 percent based on the dimethylphosphinothioic chloride charged.

*Analysis.*—Theory: 15.5% P, 16.0% S. Found: 15.1% P, 16.4% S.

Example V

To a suitable reaction vessel equipped with a thermometer and agitator is charged approximately 17.3 parts by weight (substantially 0.16 mol) of o-cresol dissolved in approximately 150 parts by weight of toluene. Thereto at room temperature is added slowly and with agitation approximately 8.3 parts by weight (substantially 0.155 mol) of sodium methylate. The mixture is then heated at 60° C. with agitation for 30 minutes. The temperature of the mass is then increased slowly to 110–115° C. to remove the methanol byproduct. The residue, i.e. the toluene slurry of sodium 2-methylphenate, is then cooled to room temperature. To the residue at room temperature is added slowly and with agitation approximately 19.2 parts by weight (substantially 0.15 mol) of dimethylphosphinothioic chloride. The reaction mass is then heated at 70–80° C. with agitation for approximately 4 hours. The agitator is stopped and the reaction mass is cooled to room temperature and filtered. The filtrate is washed first with a 3 percent aqueous sodium carbonate solution and then with water. The solvent (i.e. toluene) in the so-washed filtrate is then stripped off by heating to 100° C. at 8 mm. pressure. The colorless liquid remaining is O-(2-methylphenyl) dimethylphosphinothioate which distills at 99–102° C. at 0.3 mm. pressure. The yield is 93 percent by weight based on the dimethylphosphinothioic chloride charged.

*Analysis.*—Theory: 16.0% S, 15.5% P. Found: 15.9% S, 15.4% P.

Example VI

To a suitable reaction vessel equipped with a thermometer and agitator is charged at room temperature approximately 17.3 parts by weight (substantially 0.1 mol) of 4-bromophenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 96.5 percent yield (based on dimethylphosphinothioic chloride) of O-(4-bromophenyl) dimethylphosphinothioate, a light yellow liquid, which is soluble in acetone and ethyl acetate but insoluble in water.

*Analysis.*—Theory: 30.2% Br, 12.1% S. Found: 30.1% Br, 12.8% S.

Employing the above procedure but replacing 4-bromophenol with an equimolecular amount of 4-bromothiophenol and replacing dimethylphosphinothioic chloride with an equimolecular amount of dimethylphosphinic chloride there is obtained S-(4-bromophenyl)dimethylphosphinothioate which product is soluble in acetone but insoluble in water.

Employing the above procedure but replacing 4-bromophenol with an equimolecular amount of 4-fluorophenol there is obtained O-(4-fluorophenyl) dimethylphosphinothioate.

Example VII

To a suitable reaction vessel equipped with a thermometer and agitator is charged at room temperature approximately 16.2 parts by weight (substantially 0.1 mol) of m-trifluoromethylphenol, approximately 100 parts by weight of benzene and sufficient ethyl acetate to provide a homogeneous solution. To this solution is added with agitation approximately 10.1 parts by weight (substantially 0.1 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give an 85 percent yield (based on dimethylphosphinothioic chloride) of O-(3-trifluoromethylphenyl) dimethylphosphinothioate, a yellow oil, which is soluble in acetone but insoluble in water.

*Analysis.*—Theory: 12.6% S. Found: 11.7% S.

Employing the above procedure but replacing m-trifluoromethylphenol with an equimolecular amount of 4-cyanophenol there is obtained O-(4-cyanophenyl) dimethylphosphinothioate.

Example VIII

To a suitable reaction vessel equipped with a reflux condenser, thermometer and agitator is charged approximately 18 parts by weight (substantially 0.147 mol) of 2,6-xylenol dissolved in approximately 250 parts by weight of toluene. Thereto at room temperature is added slowly and with agitation approximately 7.5 parts by weight (substantially 0.14 mol) of sodium methylate. The mixture is then heated at 60° C. with agitation for 30 minutes. The temperature of the mass is then increased slowly to 110–115° C. to remove the methanol by-product. The residue, i.e. the toluene slurry of sodium 2,6-dimethylphenate, is then cooled to room temperature. To the residue at room temperature is added slowly and with agitation approximately 17.2 parts by weight (substantially 0.135 mol) of dimethylphosphinothioic chloride. The reaction mass is then heated at 70–80° C. with agitation for approximately 4 hours. The agitator is stopped and the reaction mass is cooled to room temperature and filtered. The filtrate is washed first with a 3 percent aqueous sodium carbonate solution and then with water. The solvent (i.e. toluene) in the so-washed filtrate is then stripped off by heating to 100° C. at 5 mm. pressure. The white solid remaining is recrystallized from hexane. The recrystallized material is white crystalline O-(2,6-dimethylphenyl) dimethylphosphinothioate melting at 94–96° C. The yield is 90 percent by weight based on the dimethylphosphinothioic chloride charged.

*Analysis.*—Theory: 15.0% S. Found: 15.0% S.

Example IX

To a suitable reaction vessel equipped with a thermometer and agitator is charged at room temperature approximately 16.3 parts by weight (substantially 0.1 mol) of 2,4-dichlorophenol, approximately 150 parts by weight of benzene and sufficient ethyl acetate to provide a homogeneous solution. To this solution is added with agitation approximately 11.1 parts by weight (substantially 0.1 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 96 percent yield (based on dimethylphosphinothioic chloride) of O-(2,4-dichlorophenyl) dimethylphosphinothioate, a white crystalline solid which on recrystallizing from hexane gave a melting point of 63–65° C.

*Analysis.*—Theory: 12.2% P, 27.8% Cl. Found: 12.0% P, 27.7% Cl.

Employing the above procedure but replacing dimethylphosphinothioic chloride with an equimolecular amount of diethylphosphinothioic chloride there is obtained O-(2,4-dichlorophenyl) diethylphosphinothioate which product is soluble in acetone but insoluble in water.

Example X

To a suitable reaction vessel equipped with a thermometer and agitator is charged at room temperature approximately 16.3 parts by weight (substantially 0.1 mol) of 3,4-dichlorophenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 93 percent yield (based on dimethylphosphinothioic chloride) of O-(3,4-dichlorophenyl) dimethylphosphinothioate, a yellow oily liquid, which is soluble in acetone but insoluble in water.

*Analysis.*—Theory: 27.8% Cl, 12.5% S. Found: 28.4% Cl, 13.0% S.

Employing the above procedure but replacing dimethylphosphinothioic chloride with an equimolecular amount of diethylphosphinothioic chloride there is obtained O-(3,4-dichlorophenyl) diethylphosphinothioate which product is soluble in acetone and insoluble in water.

Example XI

To a suitable reaction vessel equipped with a thermometer and agitator is charged at room temperature approximately 12.2 parts by weight (substantially 0.1 mol) of 3,4-xylenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.1 mol) of dimethylphosphinothioic chloride. The reaction mass is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 97.5 percent yield (based on dimethylphosphinothioic chloride) of O-(3,4-dimethylphenyl) dimethylphosphinothioate, which on recrystallization from ether gave white crystals, M.P. 50–51° C.

*Analysis.*—Theory: 14.5% P, 15.0% S. Found: 14.8% P, 15.1% S.

Employing the above procedure but replacing 3,4-xylenol with an equimolecular amount of 3,5-dimethoxyphenol, there is obtained O-(3,5-dimethoxyphenyl) dimethylphosphinothioate, an oily liquid insoluble in water.

Employing the above procedure but replacing 3,4-xylenol with an equimolecular weight of 4-methylsulfinylphenol there is obtained O-(4-methylsulfinylphenyl) dimethylphosphinothioate which is soluble in actone.

Employing the above procedure but replacing 3,4-xylenol with an equimolecular amount of 4-methylsulfonylphenol there is obtained O-(4-methylsulfonylphenyl) dimethylphosphinothioate which is insoluble in water.

Example XII

To a suitable reaction vessel equipped with a thermometer and agitator is charged at room temperature approximately 12.2 parts by weight (substantially 0.1 mol) of 3,5-xylenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 92 percent yield (based on dimethylphosphinothioic chloride) of O-(3,5-dimethylphenyl) dimethylphosphinothioate, a white solid melting at 53–56° C.

Employing the above procedure but replacing dimethylphosphinothioic chloride with an equimolecular amount of diisopropylphosphinothioic bromide there is obtained O-(3,5-dimethylphenyl) diisopropylphosphinothioate which is soluble in acetone but insoluble in water.

Example XIII

To a suitable reaction vessel equipped with a thermometer, agitator and reflux condenser is charged in the cold (about 20° C.) approximately 100 parts by weight of acetone, approximately 17.6 parts by weight (substantially 0.102 mol) of 2-chloro-4-nitrophenol, approximately 10.8 parts by weight (substantially 0.102 mol) of anhydrous sodium carbonate, and approximately 12.8 parts by weight (substantially 0.10 mol) of dimethylphosphinothioic chloride. The mixture is then heated to the reflux temperature (about 60° C.) and refluxed for about 3 hours. Thereafter the acetone is stripped off at 80° C. and the resulting residue quenched with water and the mass extracted with chloroform. The chloroform solution is then washed first with a 3 percent aqueous sodium carbonate solution and then with water. The chloroform is then stripped off by heating to 90° C. at 5 mm. pressure yielding crude O-(2-chloro-4-nitrophenyl) dimethylphosphinothiote, a tan colored solid product which upon recrystallization from diethyl ether yielded tan crystalline O-(2-chloro - 4 - nitrophenyl) dimethylphosphinothioate melting at 100–101° C. This solid is soluble in chloroform and acetone but insoluble in water.

*Analysis.*—Theory: 13.4% Cl, 12.1% S, 11.7% P. Found: 13.6% Cl, 12.2% S, 11.3% P.

Employing the above procedure but replacing dimethylphosphinothioic chloride with an equimolecular amount of diethylphosphinothioic chloride, there is obtained solid O - (2 - chloro - 4 - nitrophenyl) diethylphosphinothioate which is soluble in acetone but insoluble in water.

Example XIV

To a suitable reaction vessel equipped with a thermometer and agitator is charged at room temperature approximately 20.7 parts by weight (substantially 0.10 mol) of 4-nitro-3-fluoromethylphenol, approximately 90 parts by weight of benzene and sufficient ethyl acetate to provide a homogeneous solution. To this solution is added with agitation approximately 10.1 parts by weight (substantially 0.10 mol) of triethylamine and approximately 12.8 parts by weight (substantially 0.10 mol) of dimethylphosphinothioic chloride. The reaction mixture is then heated at 60–80° C. for 4 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give an 81 percent yield (based on dimethylphosphinothioic chloride) of O-(3-trifluoromethyl-4-nitrophenyl) dimethylphosphinothioate, an amber oily liquid, which is soluble in both acetone and benzene but insoluble in water.

*Analysis.*—Theory: 4.68% N. Found: 4.66% N.

Employing the above procedure but replacing dimethylphosphinothioic chloride with an equimolecular amount of diethylphosphinothioic chloride there is obtained O-(3-trifluoromethyl-4-nitrophenyl) diethylphosphinothioate.

*Example XV*

To a suitable reaction vessel equipped with a thermometer and agitator is charged at room temperature approximately 14.3 parts by weight (substantially 0.10 mol) of 4-chloro-3-methylphenol, approximately 150 parts by weight of benzene and sufficient ethyl acetate to provide a homogeneous solution. To this solution is added with agitation approximately 10.1 parts by weight (substantially 0.1 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 99 percent yield (based on dimethylphosphinothioic chloride) of O-(3-methyl-4-chlorophenyl) dimethylphosphinothioate, a colorless oily liquid, which is soluble in acetone but insoluble in water.

*Analysis.*—Theory: 15.1% Cl. Found: 15.8% Cl.

Employing the above procedure but replacing 4-chloro-3-methylphenol with an equimolecular amount of 4-chloro-3-methylthiophenol and replacing dimethylphosphinothioic chloride with an equimolecular amount of diethylphosphinic chloride there is obtained S-(4-chloro-3-methylphenyl) diethylphosphinothioate which is soluble in acetone but insoluble in water.

*Example XVI*

To a suitable reaction vessel equipped with a thermometer, agitator, and reflux condenser is charged approximately 2.5 parts by weight (substantially 0.014 mol) of 3-chloro-4-nitrophenol, approximately 15 parts by weight of benzene, and approximately 1.5 parts by weight (substantially 0.015 mol) of triethylamine. Sufficient ethyl acetate is added to the charge to effect complete solution. To this solution is slowly added 1.8 parts by weight (substantially 0.014 mol) of dimethylphosphinothioic chloride. The mass is then refluxed at 70–80° C. for about 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a solid residue, which upon recrystallization from benzene yielded light tan crystals of O-(3-chloro-4-nitrophenyl) dimethylphosphinothioate, M.P. 57.5–58.5° C.

*Analysis.*—Theory: 11.7% P, 13.4% Cl. Found: 11.3% P, 13.7% Cl.

Employing the above procedure but replacing dimethylphosphinothioic chloride with an equimolecular amount of diethylphosphinothioic chloride there is obtained O-(3-chloro-4-nitrophenyl) diethylphosphinothioate which material is soluble in acetone but insoluble in water.

Employing the above procedure but replacing 3-chloro-4-nitrophenol with an equimolecular amount of 2,6-dimethoxyphenol there is obtained white crystalline O-(2,6-dimethoxyphenyl) dimethylphosphinothioate.

*Example XVII*

To a suitable reaction vessel equipped with a thermometer and agitator is charged at room temperature approximately 20.0 parts by weight (substantially 0.1 mol) of 2,4,5-trichlorophenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 99 percent yield (based on dimethylphosphinothioic chloride) of O-(2,4,5-trichlorophenyl) dimethylphosphinothioate, a colorless liquid which solidified on standing to a white solid, which on recrystallization from ether gave white crystals melting at 73–75° C.

*Analysis.*—Theory: 10.7% P, 11.1% S, 36.8% Cl. Found: 9.7% P, 11.9% S, 36.3% Cl.

Employing the above procedure but replacing dimethylphosphinothioic chloride with an equimolecular amount of diethylphosphinothioic chloride there is obtained O-(2,4,5-trichlorophenyl) diethylphosphinothioate which product is soluble in acetone.

*Example XVIII*

To a suitable reaction vessel equipped with a thermometer and agitator is charged at room temperature approximately 15.6 parts by weight (substantially 0.10 mol) of 4-chloro-3,5-xylenol, approximately 150 parts by weight of benzene and sufficient ethyl acetate to provide a homogeneous solution. To this solution is added with agitation approximately 10.1 parts by weight (substantially 0.10 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the non-aqueous portion washed with a 3 percent aqueous sodium carbonate solution and then with water. The so-washed organic solution is then stripped of solvent at reduced pressure to give a 94 percent yield (based on dimethylphosphinothioic chloride) of O-(3,5-dimethyl-4-chlorophenyl) dimethylphosphinothioate, a white crystalline solid, which on recrystallization from ether melts at 62–63° C.

*Analysis.*—Theory: 12.0% P. Found: 11.6% P.

Employing the above procedure but replacing dimethylphosphinothioic chloride with an equimolecular amount of diisoamylphosphinothioic chloride there is obtained white solid O-(4-chloro-3,5-dimethylphenyl) diisoamylphosphinothioate.

*Example XIX*

To a suitable reaction vessel equipped with a thermometer and agitator is charged at room temperature approximately 29.7 parts by weight (substantially 0.1 mol) of 2,6-dibromo-4-nitrophenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 62 percent yield (based on dimethylphosphinothioic chloride) of O-(2,6-dibromo-4-nitrophenyl) dimethylphosphinothioate, a yellow solid which melted above 195° C. and which is soluble in benzene.

Analysis.—Theory: 8.0% P. Found: 7.8% P.

Employing the above procedure but replacing dimethylphosphinothioic chloride with an equimolecular amount of diethylphosphinothioic chloride there is obtained O-(2,6-dibromo-4-nitrophenyl) diethylphosphinothioate which is soluble in benzene.

Example XX

To a suitable reaction vessel equipped with a thermometer and agitator is charged at room temperature approximately 12.8 parts by weight (substantially 0.10 mol) of 3-(methylcarbonyloxy)-phenol, approximately 150 parts by weight of benzene and sufficient ethyl acetate to provide a homogeneous solution. To this solution is added with agitation approximately 10.1 parts by weight (substantially 0.1 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 97 percent yield (based on dimethylphosphinothioic chloride) of O-(3-methylcarbonyloxyphenyl) dimethylphosphinothioate, a light yellow liquid, which is soluble in acetone but insoluble in water.

Analysis.—Theory: 13.1% S. Found: 13.2% S.

Employing the above procedure but replacing 3-(methylcarbonyloxy) phenol with an equimolecular amount of 4-methylcarbonylphenol there is obtained O-(4-methylcarbonylphenyl) dimethylphosphinothioate which is soluble in acetone but insoluble in water.

Example XXI

To a suitable reaction vessel equipped with a thermometer and agitator is charged at room temperature approximately 12.4 parts by weight (substantially 0.10 mol) of 4-methoxyphenol, approximately 150 parts by weight of benzene and sufficient ethyl acetate to provide a homogeneous solution. To this solution is added with agitation approximately 10.1 parts by weight (substantially 0.10 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 98 percent yield (based on dimethylphosphinothioic chloride) of O-(4-methoxyphenyl) dimethylphosphinothioate, a low melting white solid, which on recrystallization from ether gave crystals melting at 34–35° C.

Analysis.—Theory: 14.8% S. Found: 15.1% S.

Employing the above procedure but replacing 4-methoxyphenol with an equimolecular amount of 4-ethylmercaptophenol there is obtained O-(4-ethylmercaptophenyl) dimethylphosphinothioate which is insoluble in water but soluble in acetone.

Example XXII

To a suitable reaction vessel equipped with a thermometer and agitator is charged at room temperature approximately 15.2 parts by weight (substantially 0.1 mol) of 4-(methylcarbonyloxy)-phenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give O-(4-methylcarbonyloxyphenyl) dimethylphosphinothioate.

Employing the above procedure but replacing 4-(methylcarbonyloxy) phenol with an equimolecular amount of 3,4-dimethoxyphenol there is obtained O-(3,4-dimethoxyphenyl) dimethylphosphinothioate, a yellow oil soluble in acetone and benzene but insolube in water.

Example XXIII

To a suitable reaction vessel equipped with a thermometer and agitator is charged at room temperature approximately 15.0 parts by weight (substantially 0.10 mol) of 4-tert.-butylphenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.1 mol) of dimethylphosphinothioic chloride. The reaction mixture is then heated at 70–80° C. for 3 hours. The reaction mass is then cooled to room temperature, quenched with water and the nonaqueous portion washed first with a 3 percent aqueous sodium carbonate solution and then with water. The so-washed organic solution is then stripped of solvent at reduced pressure to give a 97.5 percent yield (based on dimethylphosphinothioic chloride) of O-(4-tert.-butylphenyl) dimethylphosphinothioate, a colorless crystalline solid which on recrystallizing from hexane gave a melting point of 59–61° C.

Analysis.—Theory: 12.8% P, 13.2% S. Found: 12.3% P, 14.0% S.

Employing the above procedure but replacing dimethylphosphinothioic chloride with an equimolecular amount of diisobutylphosphinothioic chloride there is obtained colorless solid O-(4-tert.-butylphenyl) diisobutylphosphinothioate which is insoluble in water.

Example XXIV

To a suitable reaction vessel equipped with a thermometer and agitator is charged at room temperature approximately 15.2 parts by weight (substantially 0.10 mol) of 4-(methoxycarbonyl)-phenol, approximately 150 parts by weight of benzene and sufficient ethyl acetate to provide a homogeneous solution. To this solution is added with agitation approximately 11.1 parts by weight (substantially 0.11 mol) of triethylamine and approximately 12.8 parts by weight (substantially 0.10 mol) of dimethylphosphinothioic chloride. The reaction mixture is then heated at 70–80° C. for 3 hours. The reaction mass is then cooled to room temperature, quenched with water and the nonaqueous portion washed with a 3 percent aqueous sodium carbonate solution and then with water. The so-washed organic solution is then stripped of solvent at reduced pressure to give a 100 percent yield (based on dimethylphosphinothioic chloride) of O-(4-methoxycarbonylphenyl) dimethylphosphinothioate, a white solid, which on recrystallizing from methylene chloride gave a melting point of 115–117° C.

Analysis.—Theory: 12.7% P, 13.1% S. Found: 12.3% P, 13.1% S.

Employing the above procedure but replacing 4-(methoxycarbonyl) phenol with an equimolecular amount of 4-(methoxycarbonyl)-thiophenol there is obtained S-(4-methoxycarbonylphenyl) dimethylphosphinodithioate which is insoluble in water.

Example XXV

To a suitable reaction vessel equipped with a thermometer and agitator is charged at room temperature approximately 14.5 parts by weight (substantially 0.10 mol) of 4-chlorothiophenol, approximately 11.1 parts by weight (substantially 0.11 mol) of triethylamine, approximately 150 parts by weight of benzene, and approximately 12.8 parts by weight (substantially 0.10 mol) of dimethylphosphinothioic chloride. The mixture is then heated at about 60–80° C. for about 4 hours. The reaction mass is then cooled to room temperature, quenched with water and the nonaqueous portion washed with a 3 percent aqueous solution of sodium carbonate and then with water. The so-washed organic solution is then subjected to vacuum stripping to remove the solvent benzene. The white solid residue, S-(4-chlorophenyl) dimethylphosphinodithioate, upon recrystallizing from diethyl ether gave a melting point of 106–108° C.

*Analysis.*—Theory: 28.3% S, 15.7% Cl. Found: 27.3% S, 14.9% Cl.

Employing the above procedure but replacing 4-chlorothiophenol with an equimolecular amount of 3,4-dichlorothiophenol and replacing dimethylphosphinothioic chloride with an equimolecular amount of diethylphosphinothioic chloride there is obtained S-(3,4-chlorophenyl) diethylphosphinodithioate which is soluble in acetone but insoluble in water.

Employing the above procedure but replacing 4-chlorothiophenol with an equimolecular amount of 4-methoxythiophenol there is obtained S-(4-methoxyphenyl) dimethylphosphinodithioate which is insoluble in water.

In the process of making the compounds of this invention any inert organic liquid or mixture of inert organic liquids can be employed provided at least one of the reactants is soluble therein. The methods by which the phenyl dialkylphosphinothioates of this invention are isolated will vary slightly with the reactants employed and the product produced. Further purification by selective solvent extraction or by absorptive agents such as activated carbon, or clays, can precede the removal of the inert organic liquid or solvent. Additionally an inert organic solvent can be added to and in the purification by adsorptive agents. However, the product is generally satisfactory for pesticidal purposes without further purification.

The phenyl dialkylphosphinothioates of this invention are effective against a wide variety of pests. As illustrative of the activity but not limitative thereof is the following:

(a) One gram of O-(4-nitrophenyl) dimethylphosphinothioate was dissolved in sufficient acetone to make a concentrate (approximately 10% concentrate). Approximately 0.1 cc. of sorbitan monolaurate polyoxyethylene derivative (a commercial water-soluble nonionic emulsifying agent) is then mixed with the concentrate. To this mixture and with agitation is added sufficient water to provide an aqueous emulsion containing 0.006 percent by weight of O-(4-nitrophenyl) dimethylphosphinothioate. Thereupon lima bean plant leaves previously infested with the two-spotted spider mite, *Tetranychus telarius* (L.), are dipped in the aqueous emulsion, withdrawn, and set aside for observation. At the end of 48 hours a 100 percent kill of the mobile stages of the mite was noted. Seven days after setting the test specimens aside residual action was confirmed, a 100 percent kill of both the resting stage and ova stage being noted. With similarly infested leaves employing the aforedescribed aqueous emulsion but containing no O-(4-nitrophenyl) dimethylphosphinothioate no control of the mites was observed at any time.

Aqueous emulsions of the below itemized compounds were prepared as immediately above described but employing sufficient water to provide a concentration of 0.1 percent by weight of the test compound in the emulsion. These emulsions were then evaluated as immediately above described against the same variety of two-spotted spider mite in its mobile, resting and ova stages. The results were as follows:

| Compound | Percent Kill at Stage | | |
|---|---|---|---|
| | Mobile | Resting | Ova |
| O-(phenyl) dimethylphosphinothioate | 100 | 90 | 50 |
| O-(4-chlorophenyl) dimethylphosphinothioate | 100 | 97 | 90 |
| O-(4-bromophenyl) dimethylphosphinothioate | 100 | 100 | 100 |
| O-(4-t. butylphenyl) dimethylphosphinothioate | 90 | 90 | 90 |
| O-(2-methylphenyl) dimethylphosphinothioate | 50 | 50 | 50 |
| O-(3-methylcarbonyloxyphenyl) dimethylphosphinothioate | 100 | 100 | 100 |
| O-(4-methoxyphenyl) dimethylphosphinothioate | 50 | 50 | 50 |
| O-(4-methoxycarbonylphenyl) dimethylphosphinothioate | 100 | 100 | 100 |
| S-(4-chlorophenyl) dimethylphosphinodithioate | 100 | 100 | 100 |
| O-(3,5-dimethylphenyl) dimethylphosphinothioate | 95 | 95 | 95 |
| O-(2,4-dichlorophenyl) dimethylphosphinothioate | 100 | 100 | 100 |
| O-(3-methyl-4-chlorophenyl) dimethylphosphinothioate | 50 | 50 | 50 |
| O-(3-trifluoromethyl-4-nitrophenyl) dimethylphosphinothioate | 75 | 75 | 75 |
| O-(2-chloro-4-nitrophenyl) dimethylphosphinothioate | 100 | 100 | 100 |
| O-(3,5-dimethyl-4-chlorophenyl) dimethylphosphinothioate | 90 | 90 | 90 |

Contact activity was also observed in tests against yellow fever mosquito larvae, Aedes aegypti. For example, at concentrations of 10 p.p.m. aqueous emulsions of O-(4-nitrophenyl) dimethylphosphinothioate, O-(2-chloro-4-nitrophenyl) dimethylphosphinothioate, S-(4-chlorophenyl) dimethylphosphinodithioate, O-(3,5-dimethyl-4-chlorophenyl) dimethylphosphinothioate, O-(2,4,5-trichlorophenyl) dimethylphosphinothioate, O-(3 - trifluoromethylphenyl) dimethylphosphinothioate, and O-(2,6-dibromo-4-nitrophenyl) dimethylphosphinothioate exhibited kills respectively of 100 percent, 75 percent, 50 percent, 50 percent, 90 percent, 50 percent, and 100 percent.

Contact activity was also observed in tests against the southern armyworm, (*Prodenia eridanis*) and plum curculio, (*Conotrachelus nenuphar*). For example, O-(4-nitrophenyl) dimethylphosphinothioate exhibited a 100% kill against the southern armyworm at a concentration of 0.1% by weight, and exhibited a 100% kill against plum curculio at a concentration of 0.063% by weight.

(b) One gram of each of the below itemized compounds was dissolved in acetone, and to each mix was added approximately 0.1 cc. of sodium monolaurate polyoxyethylene derivative (a commercial water-soluble nonionic emulsifying agent). To the respective solutions so prepared was then added sufficient water with agitation to provide aqueous emulsions containing 0.01% by weight of each of the below itemized compounds. Freshly cut leaves of lima bean plants were then immersed in the respective aqueous emulsions for three days. The leaves were then removed and infested with the two-spotted spider mite, *Tetranychus telarius* (L.), and the percent kill (mobile stages) noted after 48 hours for each. The test compounds and respective kills are set forth below:

| | Percent |
|---|---|
| O-(4-nitrophenyl dimethylphosphinothioate | 100 |
| O-(4-chlorophenyl) dimethylphosphinothioate | 100 |
| O-(phenyl) dimethylphosphinothioate | 90 |
| O-(3-methylcarbonyloxyphenyl) dimethylphosphinothioate | 80 |
| O - (3 - methyl-4-chlorophenyl) dimethylphosphinothioate | 50 |
| O-(4-bromophenyl) dimethylphosphinothioate | 90 |
| O-(2,4-dichlorophenyl) dimethylphosphinothioate | 95 |

(c) Fungicidal activity at very low concentrations was observed employing many of the compounds of this invention. To illustrate the fungicidal activity of the compounds of this invention, separate equiweight mixtures of cornmeal and sand were prepared. These equiweight mixtures were infested with the damping-off fungus organisms, *Pythium ultimum* and *Rhizoctania solani*, respectively, and the respective infested mixtures incubated for two weeks at 20° C. Thereupon, to 10 parts by weight of each incubated infested mixture was added, with mixing, 20 parts by weight of sterile soil. Thereafter, to the respective mixtures was added a sufficient amount of each of the following individual compounds:

O-(3-trifluoromethyl-4-nitrophenyl) dimethylphosphinothioate,
O-(3,5-dimethyl-4-chlorophenyl) dimethylphosphinothioate,
O-(3-trifluoromethylphenyl) dimethylphosphinothioate,
O-(4-methoxyphenyl) dimethylphosphinothioate, and
O-(3-methyl-4-chlorophenyl) dimethylphosphinothioate, to provide a concentration of 30 p.p.m. thereof in the respective infested cornmeal-sand-soil mixtures. These mixtures were then incubated for two days at 20° C. At the end of this period, there was substantially no fungal mycelium growing over the surface of the respective test mixtures. In contrast, the surface of mixtures prepared and incubated as above, but omitting any test compound, was completely covered with the respective damping-off fungus organisms.

(d) Herbicidal sprays were prepared by dissolving the following dialkylphosphinothioates in cyclohexanone and adding the resulting solutions (together with an emulsifier which is a water-soluble mixture of sodium dodecylbenzene sulfonate, an anionic emulsifying agent, and a polyoxyethylene derivative of isooctylphenol, a nonionic emulsifying agent) to water to give respective aqueous emulsions containing 0.5 percent of the dialkylphosphinothioate based on the total weight of the aqueous emulsion. The compounds tested were:

O-(2-chloro-4-nitrophenyl) dimethylphosphinothioate,
O-(3-methyl-4-chlorophenyl) dimethylphosphinothioate, and
O-(3-trifluoromethyl-4-nitrophenyl) dimethylphosphinothioate.

The foliage of a wide variety of 21-day-old grasses and a wide variety of 21-day-old broad-leaf plants were sprayed to run-off with the respective emulsions. After 14 days in the greenhouse, under ordinary conditions of sunlight and watering, moderate to severe phytotoxicity was observed with respect to wild oats, brome, rye grass, giant foxtail, crabgrass, sorghum, radish, sugar beet, pigweed, wild buckwheat, tomato plants and soybean. In the same contact herbicidal test, but employing O-(3,5-dimethyl-4-chlorophenyl) dimethylphosphinothioate,
O-(4-methoxyphenyl) dimethylphosphinothioate, and
S-(4-chlorophenyl) dimethylphosphinodithioate, respectively, as the test compounds, moderate to severe phytotoxicity was observed against the aforementioned broad-leaf plants, but only very slight to slight phytotoxicity was observed against the aforementioned grasses.

A number of the dialkylphosphinothioates of this invention were found to be outstanding pre-emergent herbicides. Each one of the following itemized compounds, O-(2-chloro-4-nitrophenyl) dimethylphosphinothioate,
O-(3-trifluoromethyl-4-nitrophenyl) dimethylphosphinothioate,
O-(3,5-dimethyl-4-chlorophenyl) dimethylphosphinothioate,
O-(4-methoxyphenyl) dimethylphosphinothioate,
O-(3-methyl-4-chlorophenyl) dimethylphosphinothioate,
O-(4-bromophenyl) dimethylphosphinothioate,
O-(4-tert.-butylphenyl) dimethylphosphinothioate,
O-(2,4-dichlorophenyl) dimethylphosphinothioate,
O-(3,5-dimethylphenyl) dimethylphosphinothioate, was dissolved in acetone, the respective solutions were emulsified in water (the emulsifier being a water-soluble mixture of an alkylbenzene sulfonate anionic emulsifier and an alkylated phenyl polyether alcohol nonionic emulsifier), and the respective aqueous emulsions applied in spray form at the rate of 25 pounds of the respective dimethylphosphinothioates per acre to soil seeded with a wide variety of grasses and broadleaf plants. After ten days in the greenhouse under ordinary conditions of sunlight and watering, all of the above-itemized dialkylphosphinothioates displayed very pronounced to complete suppression of rye grass, sugar beet, foxtail, crabgrass, pigweed, wild buckwheat and tomato. Of the above test compounds O-(3,5-dimethylphenyl) dimethylphosphinothioate exhibited highly desirable pre-emergent inhibition of the growth of a wide variety of grasses and broadleaf plants upon supplying to the plant growing medium a quantity thereof at least sufficient to inhibit the germination of seeds contained in the plant growing medium.

Although the phosphorus containing compounds of this invention are useful per se in controlling a wide variety of pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phenyl dialkylphosphinothioates of this invention are dispersed, it means that particles of the phenyl dialkylphosphinothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semisolid viscous carrier such as petrolatum or soap or other ointment base in which they may be actually dissolved in the semisolid or held in suspension in the semisolid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the phosphorus-containing compounds of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the phenyl dialkylphosphinothioates of this invention are dispersed. It includes, therefore, the solvents of a true solution, the liquid phase of suspensions, emulsions or aerosols, the semisolid carrier of ointments and the solid phase of particulate solids, e.g., pellets, granules, dusts and powders.

The exact concentration of the phenyl dialkylphosphinothioates of this invention employed in combatting or controlling pests can vary considerably provided the required dosage (i.e., toxic or lethal amount) thereof is supplied to the pests or to the environment of the pests. When the extending agent is a liquid or a mixture of liquids (e.g. as in solutions, suspensions, emulsions or aerosols), the concentration of the phenyl dialkylphosphinothioate employed to supply the desired dosage generally will be in the range of 0.001 to 50 percent by weight. When the extending agent is a semi-solid or solid, the concentration of the phenyl dialkylphosphinothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared pesticidal spray or particulate solid. In such a concentrate composition, the phenyl dialkylphosphinothioate generally will be present in a concentration of 5 to 95 percent by weight, the residue being any one or more of the well-known pesticidal adjuvants, such as the various surface-active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions or emulsions of the phosphorus-containing compounds of this invention. For example, isopropyl ether, acetone, methyl ethyl ketone, dioxane, cyclohexanone, carbon tetrachloride, ethylene dichloride, tetrachloroethane, hexane, heptane and the like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and preferably above about 90 percent. The hydrocarbon liquids are preferred. In those instances wherein there may be concern about the phytotoxicity of the organic liquid extending agent a portion of same can be replaced by such low molecular weight aliphatic hydrocarbons as dipentene, diisobutylene, proylene trimer, and the like or suitable polar organic liquids such as the aliphatic ethers and the aliphatic ketones containing not more than about 10 carbon atoms as exemplified by acetone, methylethyl ketone, diisobutyl ketone, dioxane, isopropyl ether, and the like. In certain instances, it is advantageous to employ a mixture of organic liquids as the extending agent.

When the phosphorus-containing compounds or phenyl dialkylphosphinothioates of this invention are to be supplied to the pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphorus-containing compounds of this invention are preferably supplied to the pests or to the environment of the pests in the form of emulsions or suspensions. Emulsions or suspensions are prepared by dispersing the phosphorus-containing compound of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various emulsifying agents, dispersing agents, wetting agents and spreading agents that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition page 280). These surfactants include the well-known capillary-active substances which may be anion-active (or anionic), cation-active (or cationic), or nonionizing (or nonionic) which are described in detail in volumes I and II of Schwartz, Perry and Berch's "Surface Active Agents and Detergents" (1958, Interscience Publishers, Inc., New York) and also in the November, 1947, issue of Chemical Industries (pages 811–824) in an article entitled "Synthetic Detergents" by John W. McCutcheon and also in the July, August, September and October, 1952, issues of Soap and Sanitary Chemicals under the title "Synthetic Detergents." The disclosures of these articles with respect to surfactants, i.e. the anion-active, cation-active and nonionizing capillary active substances, are incorporated in this specification by reference in order to avoid unnecessary enlargement of this specification. The preferred surfactants are the water-soluble anionic surface-active agents and the water soluble nonionic surface-active agents set forth in U.S. 2,846,398 (issued August 5, 1958). In general it is preferred that a mixture of water-soluble anionic and water-soluble nonionic surfactants be employed.

The phosphorus-containing organic compounds of this invention can be dispersed by suitable methods (e.g., tumbling or grinding) in solid extending agents either of organic or inorganic nature and supplied to the pest environment in particulate form. Such solid materials include, for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for pesticidal purposes in the dry form or, by addition of water-soluble surfactants or wetting agents the dry particulate solids can be rendered wettable by water so as to obtain stable aqueous dispersions or suspensions suitable for use as sprays.

For special purposes the phosphorus-containing compounds of this invention can be dispersed in a semisolid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in combatting pests or they can be provided in a concentrated form suitable for mixing with or dispersing in other extending agents. As illustrative of a particularly useful concentrate is an intimate mixture of a phosphorus-containing organic compound of this invention (particularly the O-phenyl dimethylphosphinothioates of the structure

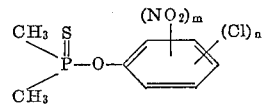

wherein $m$ is a number from 0 to 2, inclusive; wherein $n$ is a number from 0 to 3, inclusive; and wherein the sum total of $m$ and $n$ is a number from 0 to 3, inclusive) with a water-soluble surfactant which lowers the surface tension of water in the weight proportions of 0.1 to 15 parts of surfactant with sufficient of the phosphorus-containing organic compound of this invention to make 100 parts by weight. Such a concentrate is particularly adapted to be made into a spray for combatting various forms of pests (particularly mites) by the addition of water thereto. As illustrative of such a concentrate is an intimate mixture of 95 parts by weight of O-(4-nitrophenyl) dimethylphosphinothioate and 5 parts by weight of a water-soluble nonionic surfactant such as the polyoxyethylene derivative of sorbitan monolaurate.

Another useful concentrate adapted to be made into a spray for combatting pests (particularly mites) is a solution (preferably as concentrated as possible) of a phosphorus-containing organic compound of this invention (particularly the above mentioned O-phenyl dimethylphosphinothioates) in an organic solvent therefor. The said liquid concentrate preferably contains dissolved therein a minor amount (e.g., 0.5 to 10 percent by weight of the weight of the new pesticidal agent) of a surfactant (or emulsifying agent), which surfactant is also water-soluble. As illustrative of such a concentrate is a solution of O-(4-nitrophenyl) dimethylphosphinothioate in benzene which solution contains dissolved therein a water-soluble polyoxyethylene glycol nonionic surfactant and a water-soluble alkylaryl sulfonate anionic surfactant.

Of the surfactants aforementioned in preparing the various emulsifiable, wettable or dispersible compositions or concentrates of this invention, the anionic and nonionic surfactants are preferred. Of the anionic surfactants, the particularly preferred are the well known water-soluble alkylaryl sulfonates, such as sodium decylbenzene sulfonate and sodium dodecylbenzene sulfonate. Of the nonionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan.

In all of the various dispersions described hereinbefore for pesticidal purposes, the active ingredient can be one or more of the compounds of this invention. The compounds of this invention can also be advantageously employed in combination with other pesticides, including, for example, insecticides, acaricides, fungicides, and the like, as well as nematocides, bactericides and herbicides commercially available. In this manner it is possible to obtain mixtures which are effective against a wide variety of pests. The compounds of this invention are characterized by having a broad spectrum of pesticidal activity, relatively low mammalian toxicity and physical characteristics that make them easy to use per se or to formulate. In general the new pesticidal agents are substantially odorless.

In controlling or combatting pests the phenyl dialkylphosphinothioates of this invention either per se or compositions comprising same are supplied to the pests or to their environment in a lethal or toxic amount. This can be done by dispersing the new pesticidal agent or pesticidal composition comprising same in, on or over an infested environment or in, on or over an environment the pests frequent, e.g. agricultural soil or other growth media or other media infested with the pests or attractable to the pests for habitational or sustenance or propagational purposes, in any conventional fashion which permits contact between the pests and the phenyl dialkylphosphinothioates of this invention. Such dispersing can be brought about by applying the new pesticidal agents per se or pesticidal sprays or particulate solid compositions containing same to a surface infested with the pests or attractable to the pests, as for example, the surface of an agricultural soil or other media such as the above ground surface of plants by any of the conventional methods, e.g. power dusters, broom and hand sprayers, and spray dusters. Also for subsurface application such dispersing can be carried out by simply mixing the new pesticidal agent per se or pesticidal spray or particulate solid compositions comprising same with the infested environment or with the environment the pests frequent, or by employing a liquid carrier for the new pesticidal agent to accomplish subsurface penetration and impregnation thereof therein.

While this invention has been described with respect to certain embodiments, it is to be understood that it is not so limited and that variations and modifications thereof obvious to those skilled in the art can be made without departing from the spirit or scope thereof.

What is claimed is:

1. A dialkylphosphinothioate of the formula

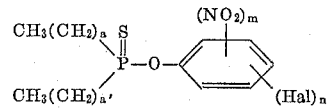

wherein $a$ and $a'$ are like integers from 0 to 1, wherein Hal is halogen having an atomic number not higher than 35, wherein $m$ is a number from 0 to 2, wherein $n$ is a number from 0 to 3; and wherein the sum of $m$ and $n$ is a whole number from 1 to 3.

2. O-(mononitrophenyl) dimethylphosphinothioate.
3. O-(monochlorophenyl) dimethylphosphinothioate.
4. O-(4-chlorophenyl) dimethylphosphinothioate.
5. O-(4-nitrophenyl) dimethylphosphinothioate.
6. O-(2-chloro-4-nitrophenyl) dimethylphosphinothioate.
7. O-(2,4-dichlorophenyl) dimethylphosphinothioate.

References Cited

UNITED STATES PATENTS

| | | |
|---|---|---|
| 2,653,161 | 9/1953 | Ballard et al. _____ 260—461.109 |
| 2,665,294 | 1/1954 | Kosolapoff _____ 260—461 |
| 2,706,194 | 4/1955 | Morris et al. |
| 2,769,743 | 11/1956 | Mattson _____ 167—30 |
| 2,910,402 | 10/1959 | Fairchild _____ 260—461.110 |
| 2,954,318 | 9/1960 | Ludvik _____ 167—30 |
| 2,967,884 | 1/1961 | Dunn et al. ___ 260—461.110 XR |
| 3,038,924 | 6/1962 | Schoot et al. _____ 260—461 |
| 3,100,790 | 8/1963 | Oertel et al. _____ 260—461 |
| 3,113,005 | 12/1963 | Gilbert. |
| 3,232,830 | 2/1966 | Schrader et al. |

FOREIGN PATENTS

| | | |
|---|---|---|
| 510,817 | 5/1952 | Belgium. |
| 576,811 | 7/1959 | Belgium. |

OTHER REFERENCES

Razumov et al. "Chem. Abst." (II), vol. 51, col. 16332–3 (1957).

Razumov et al., "Zhur. Obshchei Khim.," vol. 27, pp. 754–757 (1957).

CHARLES B. PARKER, *Primary Examiner.*

F. M. SIKORA, D. R. PHILLIPS, A. H. SUTTO,
*Assistant Examiners.*